US006729739B2

(12) United States Patent
Siegel et al.

(10) Patent No.: US 6,729,739 B2
(45) Date of Patent: May 4, 2004

(54) FOLDING FLUORESCENT ILLUMINATION SYSTEM

(75) Inventors: Mark Siegel, Fort Worth, TX (US); Wing Hang Lee, Tai Wai (HK)

(73) Assignee: Radica Games, Ltd. (BM)

( * ) Notice: Subject to any disclaimer, the term of this patent is extended or adjusted under 35 U.S.C. 154(b) by 113 days.

(21) Appl. No.: 10/074,282

(22) Filed: Feb. 11, 2002

(65) Prior Publication Data

US 2003/0076670 A1 Apr. 24, 2003

Related U.S. Application Data

(63) Continuation-in-part of application No. 10/001,929, filed on Oct. 23, 2001.

(51) Int. Cl.[7] ................................................ F21V 33/00
(52) U.S. Cl. ........................... 362/85; 362/109; 362/253
(58) Field of Search ........................ 362/85, 109, 234, 362/253, 33, 124

(56) References Cited

U.S. PATENT DOCUMENTS

| | | | |
|---|---|---|---|
| 3,023,305 A | | 2/1962 | Shapiro |
| 4,290,093 A | | 9/1981 | Thompson et al. |
| 4,312,507 A | | 1/1982 | Smith et al. |
| 4,432,042 A | | 2/1984 | Zeller |
| 4,581,684 A | | 4/1986 | Mazzucco |
| 4,598,340 A | | 7/1986 | Dwosh et al. |
| 4,772,986 A | | 9/1988 | McNemor |
| 4,893,222 A | | 1/1990 | Mintzer |
| 4,949,230 A | | 8/1990 | Burmeister |
| 5,055,977 A | | 10/1991 | Acquanetta |
| 5,065,297 A | | 11/1991 | Santambrogio |
| 5,091,832 A | | 2/1992 | Tortola et al. |
| 5,115,383 A | * | 5/1992 | Lee .............................. 362/109 |
| 5,122,937 A | * | 6/1992 | Stoudemire .................. 362/109 |
| 5,130,907 A | | 7/1992 | Tortola et al. |
| 5,169,226 A | | 12/1992 | Friedman |
| 5,180,220 A | * | 1/1993 | Van Kalsbeek .............. 362/98 |
| 5,222,806 A | | 6/1993 | Roberts, III |
| D341,855 S | | 11/1993 | Tortola et al. |
| 5,325,278 A | | 6/1994 | Tortola et al. |
| 5,325,280 A | | 6/1994 | Tortola et al. |
| D351,919 S | | 10/1994 | Rorke |
| 5,379,201 A | | 1/1995 | Friedman |
| 5,422,802 A | | 6/1995 | Lin |
| 5,550,715 A | * | 8/1996 | Hawkins ..................... 362/191 |

(List continued on next page.)

OTHER PUBLICATIONS

LS8497 GBC Light Magnifier; RC8487 GBC Folding Light Magnifier, prior to Feb. 2002.
RC8598 GBC Spot Lights, prior to Feb. 2002.
Advance Power brochure page, GA683 & GA682 Light Magnifiers; prior to Feb. 2002.
UFO Light, Imagine No Limits, NYKO Technologies, Inc. brochure; 2 pages; prior to Feb. 2002.
The Colors of PELICAN, Top Sellers, Game Boy Advance Accessories, PELICAN Accessories brochure; 3 pages; prior to Feb. 2002.
CCL Video Game Accessories brochure page, prior to Feb. 2002.

Primary Examiner—Stephen Husar
(74) Attorney, Agent, or Firm—Roylance, Abrams, Berdo & Goodman L.L.P.

(57) ABSTRACT

An illuminator for a hand-held gaming or other electronic device is provided. The illuminator includes at least one light source contained within an enclosure that is rotatably mounted to a bracket. The bracket is rotatably mounted to a member secured to the gaming/electronic device. The bracket and light source enclosure can be rotated into multiple positions during use. During non-use, the bracket and light source enclosure can be rotated into a compact area for ease of transport. A diffuse light source, comprised of the combination of a fluorescent light and a diffuser, minimize 'hot spots' on the screen of the gaming/electronic device.

58 Claims, 3 Drawing Sheets

U.S. PATENT DOCUMENTS

| | | |
|---|---|---|
| 5,695,271 A | 12/1997 | Zeller |
| 6,022,119 A | 2/2000 | Booty, Jr. |
| D423,136 S | 4/2000 | Hsich |
| D435,679 S | 12/2000 | Naghi et al. |
| 6,168,292 B1 * | 1/2001 | Sherman ............... 362/287 |
| 6,186,636 B1 | 2/2001 | Naghi et al. |
| 6,260,983 B1 | 7/2001 | Chiu |
| 6,260,984 B1 | 7/2001 | Naghi et al. |
| 6,273,581 B1 * | 8/2001 | Neiser ............... 362/109 |
| 6,328,460 B1 | 12/2001 | Grossman et al. |
| 6,354,713 B1 | 3/2002 | Leifer et al. |
| 6,361,182 B1 | 3/2002 | Leifer et al. |
| 6,361,184 B1 | 3/2002 | Hallgrimsson et al. |
| 6,367,946 B1 | 4/2002 | Leifer et al. |

* cited by examiner

FOLDING FLUORESCENT ILLUMINATION SYSTEM

CROSS-REFERENCES TO RELATED APPLICATIONS

This application is a continuation-in-part application of U.S. patent application Ser. No. 10/001,929, filed Oct. 23, 2001.

FIELD OF THE INVENTION

This application relates generally to illumination systems for electronic devices, such as computing, telecommunication and gaming devices, and is particularly directed to illumination systems for hand-held gaming devices.

BACKGROUND OF THE INVENTION

Hand-held electronic devices, such as computing, telecommunication and gaming devices, are enjoying increasing popularity. Such devices, collectively referred to herein as "gaming devices", typically use a non-backlit liquid crystal display (LCD). This type of display can be difficult to see in low light conditions. In order to overcome this problem, battery powered illuminators that can be coupled to the gaming device have become a popular accessory for such gaming devices.

Battery powered illuminators typically use an incandescent bulb, although some use a white or colored light-emitting diode (LED). For example, in one such illuminator the light source is coupled to the gaming device by a projecting support or "stalk". The illuminator's stalk is positioned above the screen when in use and is folded across the top of the gaming device when not in use. A disadvantage of this design is that the illuminator occupies more space than desired when it is not in use, substantially increasing the overall height of the gaming device. As a consequence, the gaming device is not as convenient to carry. In addition, due to this design's single, non-diffuse light source, uneven illumination is provided, typically creating high glare 'hot spots' on the device's screen.

In a second prior art illuminator utilizing a stalk configuration, the device plugs into an expansion port of the gaming device, thereby eliminating the weight associated with a separate battery. A disadvantage of this approach is the higher battery drain placed on the gaming device's battery. Additionally, this design still suffers from uneven illumination.

A third type of prior art illuminator includes an integrated magnification lens mounted over the display with a built-in light source. The third type of illuminator still has the drawback of uneven lighting.

SUMMARY OF THE INVENTION

An illuminator for a hand-held gaming or other electronic device is provided. The illuminator includes at least one light source, preferably a fluorescent light source, contained within an enclosure that is rotatably mounted to a bracket. The bracket is rotatably mounted to a member secured to the gaming/electronic device.

According to one aspect of the invention, during use the bracket is rotated away from the surface of the gaming/electronic device and the light source enclosure is rotated away from the bracket. Preferably the bracket and the light source enclosure can each be positioned within a range of positions, thus allowing the user to locate the light in the best possible location during use. During non-use, the light source enclosure is rotated back into the bracket, and the bracket is rotated back against the bracket mount and the surface of the gaming/electronic device.

According to another aspect of the invention, glare and illumination 'hot spots' are reduced, if not substantially eliminated, from the screen of the gaming/electronic device. In part, this is accomplished by allowing the light source to be positioned within a range of positions, including off-axis. Additionally, the preferred light source, a fluorescent light, produces diffuse light. Preferably the light enclosure interposes a window between the light source and the gaming device, the window further diffusing the light. In at least one embodiment of the invention, the bracket mounting member masks the screen of the gaming/electronic device and aids in the reduction of glare by means of both mounting material characteristics (e.g., color, surface roughness) and geometry (e.g., sloped regions bordering the screen).

A further understanding of the nature and advantages of the present invention may be realized by reference to the remaining portions of the specification and the drawings.

DESCRIPTION OF THE SPECIFIC EMBODIMENTS

Figure 1:
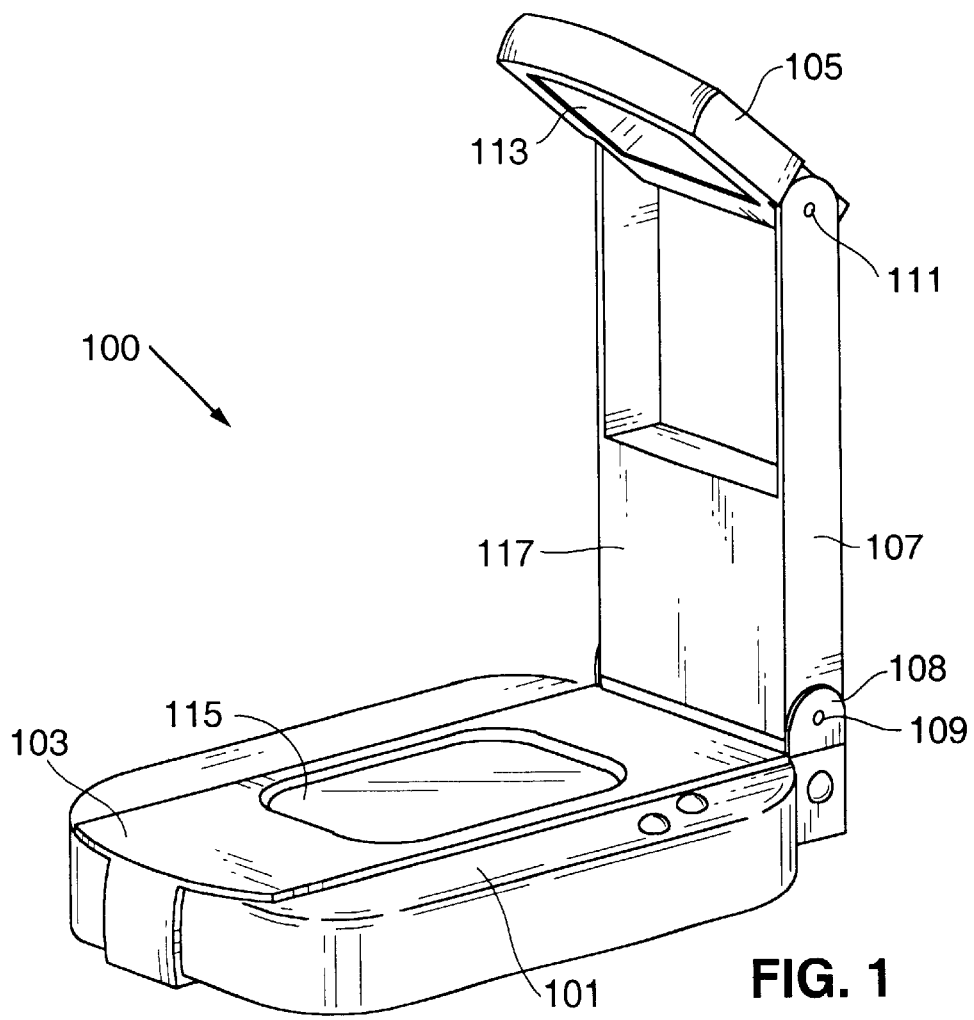
FIG. 1 is an illustration of an embodiment of the invention attached to a gaming device, the illuminator positioned for use.

FIG. 1 is an illustration of an illuminator 100 in accordance with one embodiment of the invention. As shown, illuminator 100 is attached to a gaming device 101, such as a Game Boy Advanced™ by Nintendo. It is understood that the present invention can also be used with other dedicated gaming systems such as Game Boy™ as well as personal digital assistants (PDAs), palm-top computers, and other electronic devices that may require external illumination to be useable under adverse lighting conditions. It will be appreciated that minor alterations to the means used to attach the illuminator to the gaming device may be required in order to utilize the invention with another device.

Illuminator 100 is comprised of a mounting member 103, a light housing 105, and a pivotable bracket 107. Bracket 107 pivots about pin 109, thus allowing the illuminator to be stored against gaming device 101 during non-use, and then re-positioned during use. Typically during use, bracket 107 is positioned at an angle of 90 degrees or less relative to mounting member 103. In a similar fashion, light housing 105 is pivotable about pin 111, thus allowing the light transmitted through light window 113 to be optimally positioned relative to screen 115 of device 101. During use, preferably light housing 105 is positioned at an angle of more than 90 degrees but less than 180 degrees relative to bracket 107, and more preferably at an angle of more than 90 degrees but less than 135 degrees relative to bracket 107. In preparation for storage, light housing 105 is pivoted such that it is flush or close to flush with bracket 107.

Figure 2:
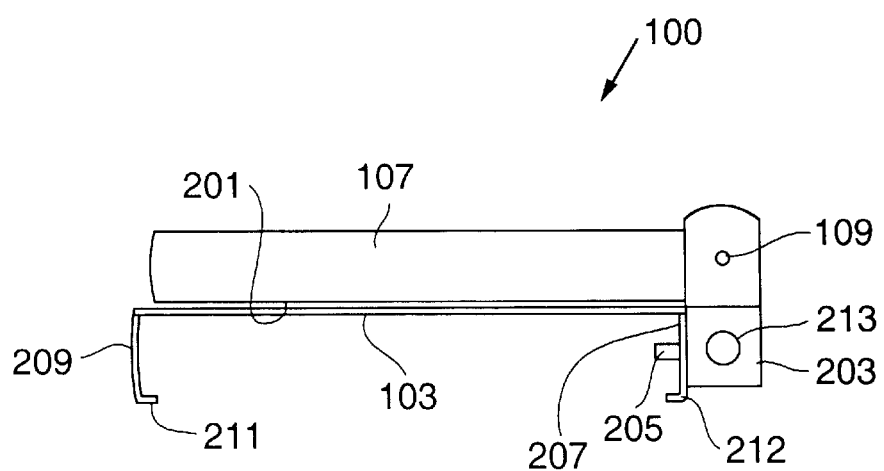
FIG. 2 is a cross-sectional view of the preferred embodiment of the illuminator system.

FIG. 2 is a cross-section view of illuminator 100, the illumination system being in a closed position. Accordingly, bracket 107 is pivoted about pin 109 such that face 201 of bracket 107 is adjacent to and approximately parallel with the top surface of mounting member 103.

Preferably means are included to insure that once a position has been selected for bracket 107 relative to mounting member 103, it does not accidentally move. For example, bracket 107 can be coupled to mounting member 103 via a pair of hinge members 108. If the fit between bracket 107 and hinge members 108 is sufficiently tight, friction will prevent accidental movement. Alternately, bracket 107 and hinge members 108 can include complementary sets of ridges and grooves or complementary sets of tabs and slots that prevent accidental movement. It will be understood that these techniques as well as others are well known techniques for maintaining the relative positions of two hinged members. Accordingly, further detail will not be provided. It will also be understood that these or other techniques can be used to maintain the position of light housing 105 relative to bracket 107.

Figure 3:
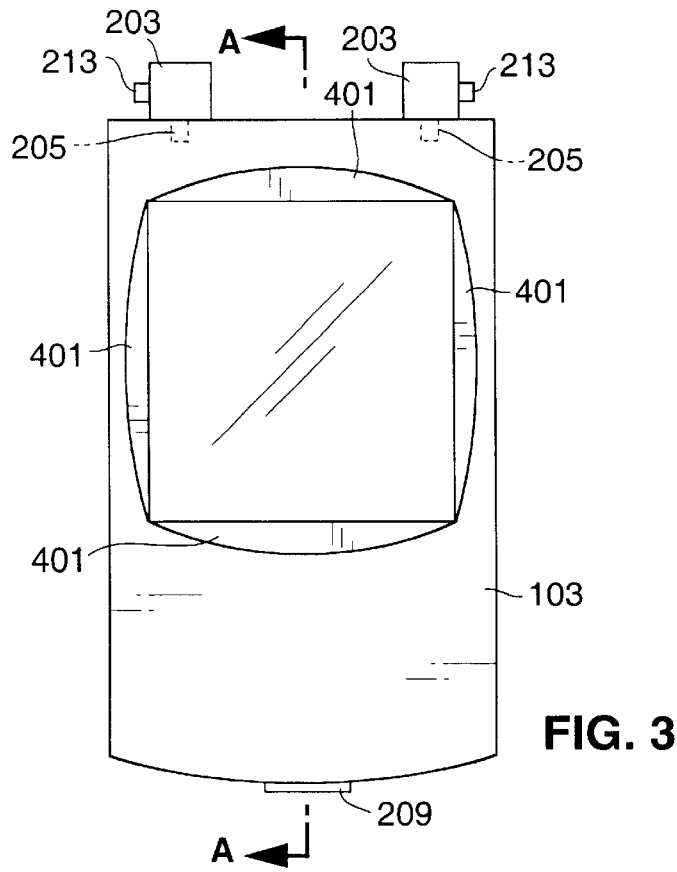
FIG. 3 is a top view of the mounting member of the illuminator shown in FIG. 2.

FIGS. 2 and 3 illustrate the preferred method of coupling illuminator 100 to a gaming device (not shown). FIG. 3 is a top view of mounting member 103. Note that in order to better illustrate the preferred coupling method, bracket 107 and light housing 105 are not shown in FIG. 3.

Attached to the back surface of mounting member 103 is a pair of coupling members 203. Protruding from each coupling member 203 is a pin 205. When illuminator 100 is attached to a gaming device (not shown), pins 205 are inserted into complementary openings within the body of the gaming device. To insure a secure fit between mounting member 103 and the gaming device, the body of the gaming device is captured between surfaces 207 of coupling members 203 and flange 209. In at least one embodiment of the invention, flange 209 includes a portion 211 that curves under the lower face of the gaming device, thus further securing mounting member 103 to the device. Similarly, in at least one embodiment, each coupling member 203 includes a flange 212 that curves under the lower face of the gaming device adjacent to members 203.

In a preferred embodiment of the invention, pins 205 are compressible, thus allowing member 203 to be easily fit to the gaming device without requiring that it be bent, bowed, or otherwise deformed during mounting. Preferably pins 205 are spring loaded, for example by locating a spring in each coupling member 203 on axis with the pins, the springs placing the pins under tension. In at least one embodiment, pins 205 can be locked into place, thus securing member 103 in place by insuring that the pins cannot be accidentally retracted, for example by a sudden jolt during game transport. Push button releases (e.g., buttons 213) can be used to release or reduce spring tension on pins 205, thus allowing easy coupling and uncoupling of the illuminator from the gaming device. If the embodiment allows pins 205 to be lockable, preferably buttons 213 release the pin locks.

In at least one embodiment of the invention, the end portion of each pin 205 is hooked, thus providing a means of locking the pins and illuminator to the gaming device. Preferably springs are used to insure that the hooked portions remain in place. In this embodiment, buttons 213 are used to apply off-axis pressure to pins 205, thus providing a means of unhooking the hooked portions from the gaming device and allowing the illuminator to be uncoupled from the gaming device.

It will be appreciated that other means can be used to couple illuminator 100 to a gaming device. For example, the number, size and location of pins 205 can be altered to match complementary openings within the gaming device. Other mounting means may rely solely on the gaming device being held in place between multiple mounting member tabs or brackets. Still other mounting means may utilize straps, preferably elastic straps.

Figure 4:
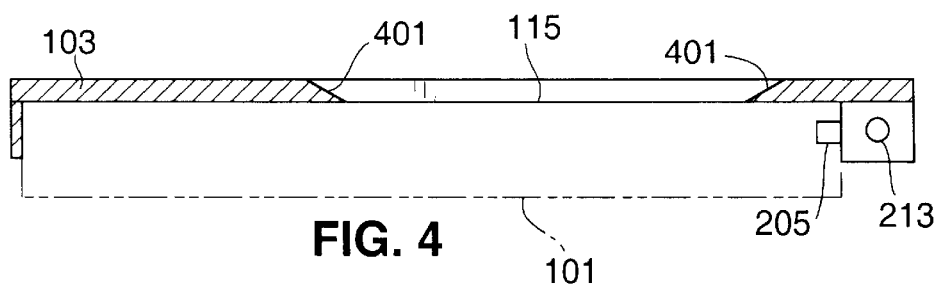
FIG. 4 is a cross-sectional view of the mounting member shown in FIG. 3 along plane A—A.

FIG. 4 is a cross-sectional view of the mounting member shown in FIG. 3 along plane A—A. Gaming device 101 and gaming device screen 115 are shown in phantom. In a preferred embodiment of the invention, mounting member 103 masks the edge of gaming device 101 surrounding gaming device screen 115, thus eliminating reflections from this area of the gaming device. Preferably at least this portion of mounting member 103 is made of a material of low reflectivity, thus helping to minimize reflections. Also preferably, the edge of member 103 bordering screen 115 is sufficiently thick to include a sloped portion 401. Sloped portion 401 helps to further reduce the glare on screen 115. Potential sources of screen glare include light from illuminator 100 as well as ambient light.

Figure 5:
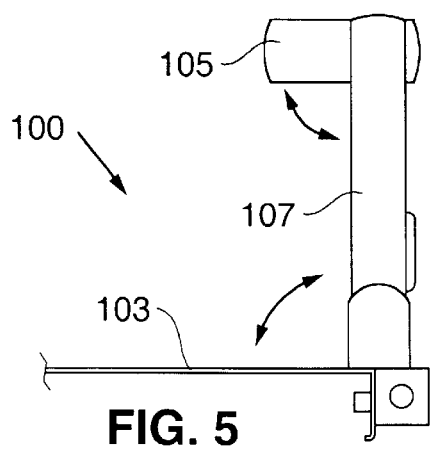
FIG. 5 is a cross-sectional view of the illuminator in its fully open position.
Figure 6:
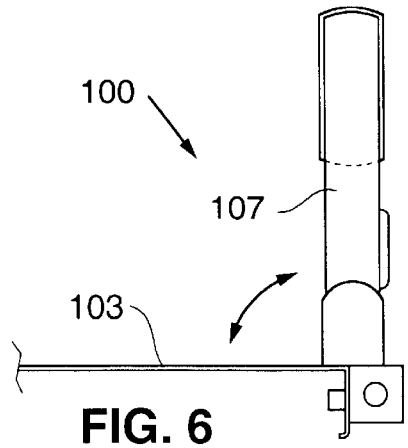
FIG. 6 is a cross-sectional view of the illuminator with the light source folded, but the light source bracket unfolded.

FIGS. 5 and 6 are cross-sectional views of illuminator 100, initially in its fully open position (i.e., FIG. 5), and then with the light source folded, but the light source bracket unfolded (i.e., FIG. 6). Previously described FIG. 2 shows illuminator 100 in the fully closed position.

Figure 7:
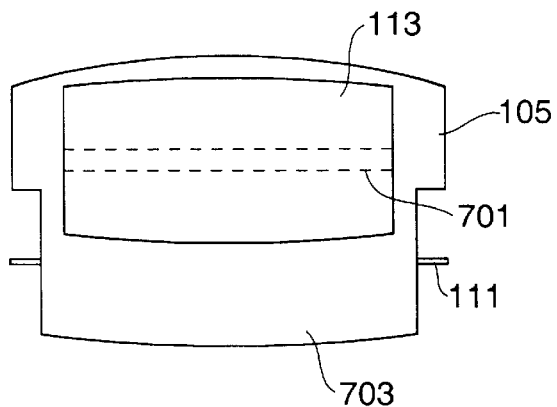
FIG. 7 is an illustration of a preferred embodiment of a light housing for use with the illuminator.

FIG. 7 is an illustration of a preferred embodiment of light housing 105. Within light housing 105 is at least one fluorescent light source 701, preferably a fluorescent tube approximately 50 millimeters long. It is understood that more than one fluorescent light source can be used as well as other sizes. The benefit of using a fluorescent light source is that it creates a more diffuse light than either an LED or an incandescent light, thus dramatically reducing 'hot spots' on screen 115. To further reduce hot spots, window 113 is preferably roughened, frosted, or otherwise treated to further diffuse the light emitted by fluorescent source 701.

The electronics necessary to control source 701 are preferably housed within portion 703 of light housing 701, although it is understood that the electronics can be housed in other locations such as portion 117 of bracket 107. Preferably portion 117 houses a battery supply for source 701. The on/off switch for source 701 is preferably located on portion 117 as well.

Figure 8:
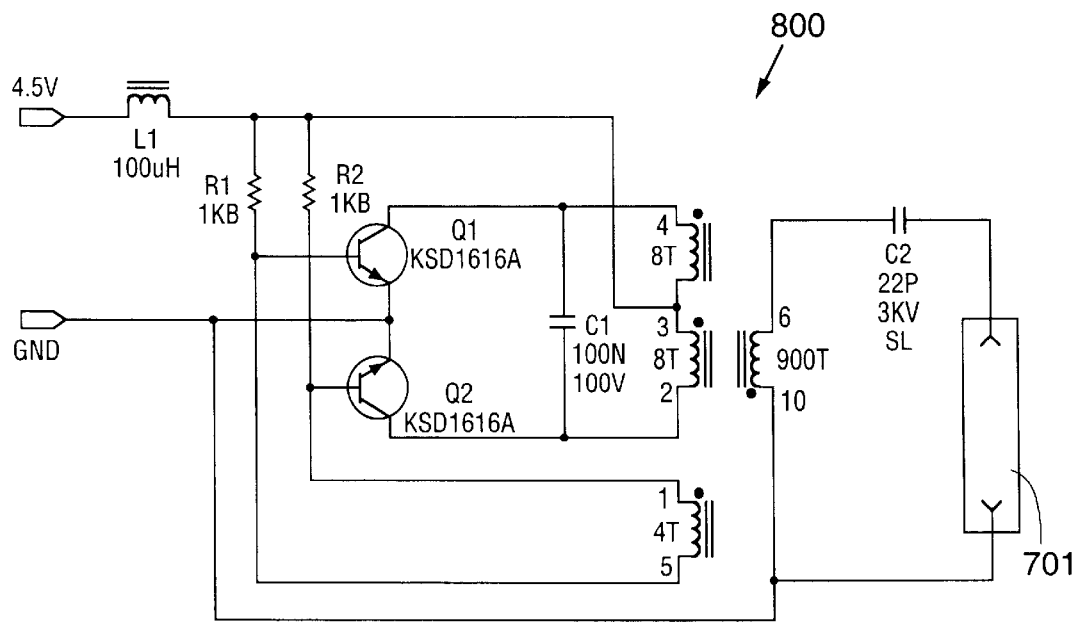
FIG. 8 schematically illustrates the preferred control circuit for the fluorescent illumination source used in the preferred embodiment of the invention.

FIG. 8 schematically illustrates the preferred control circuit for source 701. It will be appreciated by those of skill in the art, that other circuits can be used to supply power to, and control of, source 701. For example, a RangeMAX® controller such as the LX1689 from Microsemi can be used.

As will be understood by those familiar with the art, the present invention may be embodied in other specific forms without departing from the spirit or essential characteristics thereof. For example, the means by which the illumination system is coupled to the gaming or other electronic device, the means by which the illumination source is positioned relative to the screen of the gaming or other electronic device, and the circuit or power source used in conjunction with the illumination source, are not limited to those means and circuits specifically disclosed. Accordingly, the disclo-

What is claimed is:

1. A lighting unit for use with a hand held electronic game, comprising:
   a frame having first and second opposing end portions;
   a mounting member coupled to said first end portion of said frame, said mounting member including first and second opposite surfaces, a securing element adapted to mount the hand held electronic game to said first surface, a centrally disposed opening extending from said first surface to said second surface and sized to accommodate a display screen of the hand held electronic game; and
   an illumination device coupled to said second end portion of said frame, said illumination device including a fluorescent light source directing light to the display screen of the hand held electronic game.

2. A lighting unit according to claim 1, wherein
   said mounting member is rotatably coupled to said frame allowing said mounting member to move between folded and unfolded positions with respect to said frame.

3. A lighting unit according to claim 1, wherein
   a border of said mounting member includes at least one sloped portion sloping towards the display screen of the hand held electronic game.

4. A lighting unit according to claim 1, wherein
   said securing element extends from said mounting member to mount the hand held electronic game adjacent said first surface of said mounting member.

5. A lighting unit according to claim 1, wherein
   said mounting member includes a second securing element and the hand held electronic game is received between said securing members.

6. A lighting unit according to claim 1, wherein
   said mounting member is made of a substantially non-reflective material.

7. A lighting unit according to claim 1, wherein
   the display screen of the hand held electronic game is aligned with said opening in said mounting member.

8. A lighting unit according to claim 1, wherein
   a border is defined along an outer edge of said opening and substantially encloses said opening.

9. A lighting unit according to claim 1, wherein
   said frame includes first and second arms supporting said illumination device in a space therebetween.

10. A lighting unit according to claim 9, wherein
    said illumination device is rotatably coupled to a distal end of each of said first and second arms.

11. A lighting unit according to claim 1, wherein
    said illumination device includes a diffuse window for diffusing light from said fluorescent light source.

12. A lighting unit according to claim 1, wherein
    said illumination device is rotatably coupled to said second end portion of said frame; and
    said mounting member is rotatably coupled to said first end portion of said frame.

13. A lighting unit according to claim 1, wherein
    said securing element extends from a first end of said mounting member;
    a second securing element extends from second end of said mounting member opposite said first end; and
    the band held electronic game is received between said securing elements.

14. A lighting unit according to claim 13, wherein
    said securing elements extend in a direction away from said illumination device.

15. A lighting unit according to claim 1, wherein
    said securing element includes a spring operated pin including a hook end that is adapted to engage the mounting surface of the hand held electronic game.

16. A lighting unit according to claim 15, wherein
    said securing element includes an actuator adapted to move said spring operated pin between locked and unlocked positions.

17. A lighting unit according to claim 1, wherein
    said frame includes a battery compartment located near said second end portion.

18. A lighting unit according to claim 1, wherein
    said first and second surfaces of said mounting member are substantially planar upper and lower surfaces, respectively.

19. A lighting unit according to claim 1, wherein
    said mounting member is made of a substantially non-reflective material.

20. A lighting unit for use with a hand held electronic game having a display screen and a mounting surface, comprising:
    a frame having first and second opposing end portions;
    a mounting member rotatably coupled to said first end portion of said frame, said mounting member including a securing element adapted to engage the mounting surface of the hand held electronic game to mount said mounting member to the hand held electronic game, said mounting member is movable between a folded position and an open position with respect to said frame; and
    an illumination device, coupled to said second end portion of said frame, and including a fluorescent light source adapted to illuminate at least a portion of the display screen of the hand held electronic game.

21. A lighting unit according to claim 20, wherein
    said illumination device is rotatably coupled to said second end portion of said frame.

22. A lighting unit according to claim 20, wherein
    said securing element extends from a first end of said mounting member;
    a second securing element extends from a second end of said mounting member opposite said first end;
    said securing elements extend in a direction away from said illumination device; and
    the hand held electronic game is received between said securing elements.

23. A lighting unit according to claim 20, wherein
    said securing element includes a spring operated pin including a hook end that is adapted to engage the mounting surface of the hand held electronic game.

24. A lighting unit according to claim 23, wherein
    said securing element includes an actuator adapted to move said spring operated pin between locked and unlocked positions.

25. A lighting unit according to claim 20, wherein
    said mounting member includes a centrally disposed opening sized to accommodate the display screen of the hand held electronic game.

26. A lighting unit according to claim 25, wherein said mounting member includes a border defined around an outer edge of said opening and substantially enclosing said opening.

27. A lighting unit according to claim 26, wherein said border includes at least one sloped portion sloping towards the display screen of the hand held electronic game.

28. A lighting unit for use with a hand hell electronic game having a display screen and a mounting surface, comprising:
   a frame having first and second opposing end portions;
   a mounting member rotatably coupled to said first end portion of said frame, said mounting member including a securing element adapted to engage the mounting surface of the hand held electronic game to mount said mounting member to the hand held electronic game; and
   an illumination device, rotatably coupled to said second and portion of said frame, and including a fluorescent light source adapted to illuminate at least a portion of the display screen of the hand held electronic game.

29. A lighting unit according to claim 28, wherein said securing element extends from a first end of said mounting member;
   a second securing element extends from a second end of said mounting member opposite said first end;
   said securing elements extend in a direction away from said illumination device; and
   the hand held electronic game is received between said securing elements.

30. A lighting unit according to claim 28, wherein said securing element includes a spring operated pin including a hook end that is adapted to engage the mounting surface of the hand held electronic game.

31. A lighting unit according to claim 30, wherein said securing element includes an actuator adapted to move said spring operated pin between locked and unlocked positions.

32. A lighting unit according to claim 28, wherein said mounting member includes a centrally disposed opening sized to accommodate the display screen of the hand held electronic game.

33. A lighting unit according to claim 28, wherein said mounting member includes a border defined around an outer edge of said opening and substantially enclosing said opening.

34. A lighting unit according to claim 33, wherein said border includes at least one sloped portion sloping towards the display screen of the hand held electronic game.

35. A lighting unit according to claim 28, wherein said frame includes first and second arms supporting said illumination device in a space therebetween.

36. A lighting unit according to claim 28, wherein said illumination device includes a diffuse window for diffusing light from said fluorescent light source.

37. A lighting unit according to claim 28, wherein said frame includes a battery compartment located near said second end portion.

38. A lighting unit according to claim 28, wherein said mounting member includes substantially planar upper and lower surfaces.

39. A lighting unit according to claim 28, wherein said mounting member is made of a substantially non-reflective material.

40. A lighting unit for use with a hand held electronic game having a display screen and a mounting surface comprising:
   a frame having first and second opposing end portions;
   a mounting member coupled to said first end portion of said frame, said mounting member including a securing element having a spring operated pin including a hook end that is adapted to engage the mounting surface of the hand held electronic game to mount said mounting member to the hand held electronic game; and
   an illumination device, coupled to said second end portion of said frame, and including a fluorescent light source adapted to illuminate at least a portion of the display screen of the hand held electronic game.

41. A lighting unit according to claim 40, wherein said securing element includes an actuator adapted to move said spring operated pin between locked and unlocked positions.

42. A lighting unit according to claim 40, wherein said mounting member includes a centrally disposed opening sized to accommodate the display screen of the hand held electronic game.

43. A lighting unit according to claim 42, wherein said mounting member includes a border defined around an outer edge of said opening and substantially enclosing said opening.

44. A lighting unit according to claim 43, wherein said border includes at least one sloped portion sloping towards the display screen of the hand held electronic game.

45. A lighting unit for use with a hand held electronic game having a display screen and a mounting surface, comprising:
   a frame having first and second opposing end portions;
   a mounting member coupled to said first end portion of said frame, said mounting member including a securing element adapted to engage the mounting surface of the hand held electronic game to mount said mounting member to the hand held electronic game, and a centrally disposed opening sized to accommodate the display screen of the hand held electronic game; and
   an illumination device, coupled to said second end portion of said frame, and including a fluorescent light source adapted to illuminate at least a portion of the display screen of the hand held electronic game.

46. A lighting unit according to claim, 45, wherein said mounting member includes a border defined around an outer edge of said opening and substantially enclosing said opening.

47. A lighting unit according to claim 45, wherein said border includes at least one sloped portion sloping towards the display screen of the hand held electronic game.

48. A lighting unit according to claim 45, wherein said illumination device is rotatably coupled to said frame.

49. A lighting unit according to claim 45, wherein said securing element extends in a direction away from said illumination device.

50. A lighting unit according to claim 45, wherein said frame includes a battery compartment located near said second end portion.

51. A method of using a lighting unit with a hand held electronic game having a display screen, comprising the steps of:

mounting the hand held electronic game to a mounting member of the lighting unit by engaging a securing element of the lighting unit with a mounting surface of the hand held electronic game;

exposing the display screen of the hand held electronic game while the hand held electronic game mounted to the mounting member of the lighting unit;

illuminating at least a portion of the display screen of the hand held electronic game by directing a fluorescent light source toward the display screen; and unfolding the mounting member of the lighting unit prior to mounting the hand held electronic game on the mounting member by rotating the mounting member away from a frame of the lighting unit.

52. A method according to claim 51, further comprising the step of folding the mounting member of the lighting unit after mounting the hand held electronic game on the mounting member by rotating the mounting member toward a frame of the lighting unit.

53. A method according to claim 51, further comprising the step of aligning the display screen with an opening in the mounting member of the hand held electronic game.

54. A method according to claim 51, further comprising the step of rotating the fluorescent light source to provide the desired amount of illumination of the display screen of the hand held game.

55. A method of using a lighting unit with a hand held electronic game having a display screen, comprising the steps of:

mounting the hand held electronic game to a mounting member of the lighting unit by engaging a securing element of the lighting unit with a mounting surface of the hand held electronic game;

exposing the display screen of the hand held electronic game while the band held electronic game mounted to the mounting member of the lighting unit;

illuminating at least a portion of the display screen of the hand held electronic game by directing a fluorescent light source toward the display screen; and folding the mounting member of the lighting unit after mounting the hand held electronic game on the mounting member by rotating the rotating member toward a frame of the lighting unit.

56. A method according to claim 55, further comprising the step of aligning the display screen with an opening in the mounting member of the hand held electronic game.

57. A method according to claim further comprising the step of rotating the fluorescent light source to provide the desired amount of illumination of the display screen of the hand held game.

58. A method of using a lighting unit with a hand held electronic game having a display screen, comprising the steps of:

mounting the hand held electronic game to a mounting member of the lighting unit by engaging a securing element of the lighting unit with a mounting surface of the hand held electronic game;

exposing the display screen of hand held electronic game while the hand held electronic game mounted to the mounting member of the lighting unit;

illuminating at least a portion of the display screen of the hand held electronic game by directing fluorescent light source toward the display screen; and aligning the display screen with an opening in the mounting member of the band held electronic game.

\* \* \* \* \*